United States Patent
Naitou et al.

(12)

(10) Patent No.: US 7,215,862 B2
(45) Date of Patent: May 8, 2007

(54) PROCESS FOR PRODUCING OPTICAL WAVEGUIDE

(75) Inventors: Ryuusuke Naitou, Osaka (JP); Hideyuki Usui, Osaka (JP); Amane Mochizuki, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 11/276,590

(22) Filed: Mar. 7, 2006

(65) Prior Publication Data
US 2006/0204196 A1    Sep. 14, 2006

(30) Foreign Application Priority Data
Mar. 9, 2005    (JP)    ............ P.2005-066003

(51) Int. Cl.
*G02B 6/10*    (2006.01)
(52) U.S. Cl. ............ 385/129; 385/130; 385/131
(58) Field of Classification Search ........ 385/129–131
See application file for complete search history.

(56) References Cited

U.S. PATENT DOCUMENTS 6,608,946 B2 *    8/2003    Kikuchi et al. ............ 385/14

FOREIGN PATENT DOCUMENTS

| EP | 0 911 658 A1 | 4/1999 |
|---|---|---|
| EP | 1 312 948 A2 | 5/2003 |
| JP | 103000961 A | 11/1998 |

OTHER PUBLICATIONS

European Search Report dated Jun. 7, 2006.

* cited by examiner

*Primary Examiner*—Jennifer Doan
(74) *Attorney, Agent, or Firm*—Sughrue Mion, PLLC

(57) ABSTRACT

The present invention provides a process for producing an optical waveguide which comprises: disposing on an undercladding layer at least one member for forming an optical-path deflection plane; forming a photosensitive resin layer over the undercladding layer so as to at least partly cover the member for forming an optical-path deflection plane; subjecting the photosensitive resin layer to exposure and then development to thereby form at least one core layer; and forming an overcladding layer over the undercladding layer so as to cover the at least one core layer.

3 Claims, 3 Drawing Sheets

PROCESS FOR PRODUCING OPTICAL WAVEGUIDE

FIELD OF THE INVENTION

The present invention relates to a process for producing an optical waveguide. More particularly, the invention relates to a process for producing an optical waveguide for deflecting an optical path

BACKGROUND OF THE INVENTION

Among optical waveguides which optically connect optical devices to one another, the optical waveguides for optical-path deflection are used as optical-path deflection elements in electro-optic hybrid circuit boards, etc.

Processes for producing such an optical-path deflection element which have been proposed include, for example, a method in which a blade having a tip with an inclined plane is used to conduct cutting while applying the blade perpendicularly to the optical waveguide to thereby form in the optical waveguide an inclined end face serving as a micromirror (see, for example, patent document 1).

Patent Document 1: JP-A-10-300961

However, in the method described in patent document 1, the inclined end face serving as a micromirror for each of optical paths disposed parallel to one another is linearly formed along the direction perpendicular to the lengthwise direction of the optical paths, because cutting with the blade having a tip with an inclined plane is conducted while applying the blade perpendicularly to the optical waveguide. Namely, a micromirror for optical-path deflection is formed in each of the optical paths in the same position in the lengthwise direction for the optical paths. The conventional method hence has a drawback that it cannot be used to form micromirrors, in accordance with respective optical paths, at different positions in the lengthwise direction of the optical paths.

SUMMARY OF THE INVENTION

An object of the invention is to provide a process for optical-waveguide production by which a light-reflecting layer for optical-path deflection can be formed, in accordance with each optical path, at any desired position in the lengthwise direction of the optical path.

Other objects and effects of the invention will become apparent from the following description.

For accomplishing the object, the invention provides a process for producing an optical waveguide which comprises:

disposing on an undercladding layer at least one member for forming an optical-path deflection plane;

forming a photosensitive resin layer over the undercladding layer so as to at least partly cover the member for forming an optical-path deflection plane;

subjecting the photosensitive resin layer to exposure and then development to thereby form at least one core layer; and forming an overcladding layer over the undercladding layer so as to cover the at least one core layer.

The process of the invention preferably further comprises a step of removing the member for forming an optical-path deflection plane, after the formation of the photosensitive resin layer and before the formation of the core layer. This process preferably further comprises a step of forming a light-reflecting layer, after the removal of the member for forming an optical-path deflection plane, on that end face of the photosensitive resin layer that had been in contact with the member for forming an optical-path deflection plane.

In another preferred embodiment of the invention, the member for forming an optical-path deflection plane has a light-reflecting layer formed on a surface thereof that is to be in contact with the photosensitive resin layer.

In the process of the invention for producing an optical waveguide, a member for forming an optical-path deflection plane can be disposed, in accordance with each core layer serving as an optical path for transmitting light therethrough, on an undercladding layer at any desired position in the lengthwise direction of the core layer. Consequently, a light-reflecting layer for deflecting the optical path of each core layer can be formed, in accordance with each core layer, at any desired position in the lengthwise direction of the core layer. As a result, according to the process for optical-waveguide production of the invention, an optical waveguide can be produced which includes two or more core layers and in which the optical paths of the core layers each can be independently deflected at any desired position. Namely, an optical waveguide having a high degree of freedom of optical-path deflection can be produced.

Figure 1:
FIGS. 1(a) to (h) are views showing steps of one embodiment of the process of the invention for producing an optical waveguide: (a) illustrates the step of preparing an undercladding layer; (b) illustrates the step of disposing members for optical-path deflection plane formation on the undercladding layer; (c) illustrates the step of forming a photosensitive resin layer over the undercladding layer so as to partly cover the members for optical-path deflection plane formation; (d) illustrates the step of removing the members for optical-path deflection plane formation; (e) illustrates the step of forming a light-reflecting layer on each end face of the photosensitive resin layer; (f) illustrates the step of exposing the photosensitive resin layer; (g) illustrates the step of developing the photosensitive resin layer to form core layers; and (h) illustrates the step of forming an overcladding layer over the undercladding layer so as to cover the core layers
Figure 1:
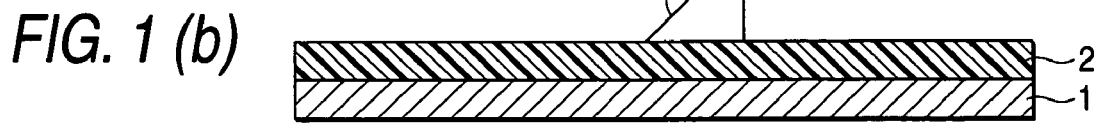
Figure 1:
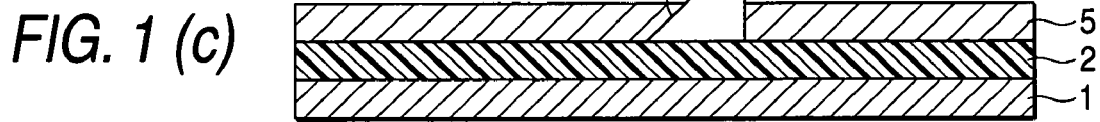
Figure 1:
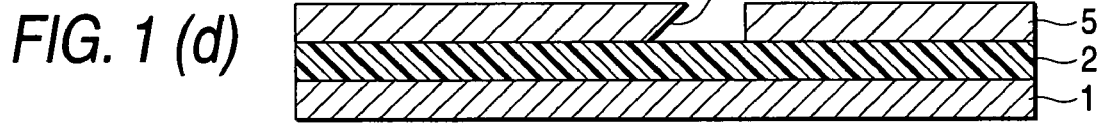
Figure 1:
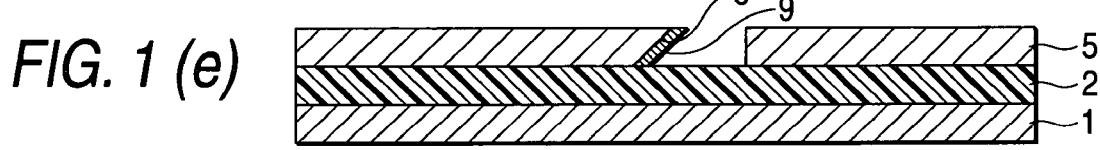
Figure 1:
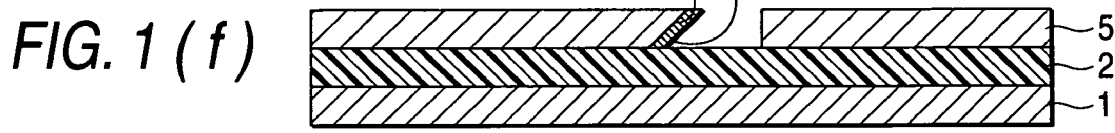
Figure 1:
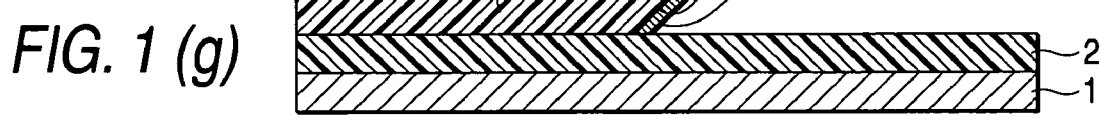
Figure 1:

The reference numerals used in the drawings denote the followings, respectively.

2: Undercladding layer
3: Member for optical-path deflection plane formation
4: Core layer
5: Photosensitive resin layer
7: Overcladding layer 8: End face of photosensitive resin layer
9: Light-reflecting layer
10: Inclined plane
11: Optical waveguide

DETAILED DESCRIPTION OF THE INVENTION

FIG. 1 are views showing steps of one embodiment of the process of the invention for producing an optical waveguide. In this process, an undercladding layer 2 is prepared first.

The undercladding layer 2 is prepared, for example, by forming it on a substrate 1 as shown in FIG. 1(a).

The substrate 1 is not particularly limited. For example, a substrate (flat plate) comprising a silicon wafer, blue plate glass, synthetic quartz, glass-epoxy resin, polyimide resin, or the like is used.

The material to be used for forming the undercladding layer 2 is not particularly limited. However, from the standpoint of transparency, the material includes, for example, a polyimide resin, polyamide resin, silicone resin, epoxy resin, fluorinated or deuterized resin obtained from any of these resins, fluorene derivative resin, and the like. These resins preferably are used in the form of photosensitive resins containing a photosensitizer. It is preferred to use a photosensitive polyimide resin (raw material: a photosensitive poly(amic acid) resin or a photosensitive fluorinated poly(amic acid) resin) or a photosensitive fluorene derivative resin (raw material: a photosensitive fluorene derivative).

The formation of the undercladding layer 2 on a substrate 1 can be carried out, for example, by a method which comprises preparing a varnish of any of those resins (resin solution), applying the varnish onto the substrate 1 by, e.g., casting or spin coating, subsequently drying the varnish, and optionally heating the coating. The thickness of the undercladding layer 2 is preferably 5 to 100 µm in the case of using a photosensitive resin, exposure is conducted after the varnish application and drying, and the exposed coating film is developed as needed.

Subsequently, in this process, members for optical-path deflection plane formation 3 are disposed on the undercladding layer 2 as shown in FIG. 1(b).

The members for optical-path deflection plane formation 3 each comprise a prism. For example, a prism made of synthetic quartz or a prism made of borosilicate glass (BK-7) is used. More specifically, each member for optical-path deflection plane formation 3 to be used is, for example, a triangular prism obtained from a square prism having a side length of from 30 µm to 1 cm made of synthetic quartz or borosilicate glass (BK-7) by cutting it along the plane extending through corresponding diagonal lines in the opposed square faces. The inclined plane 10, which is the plane formed by the cutting, has a smooth surface.

Figure 2:
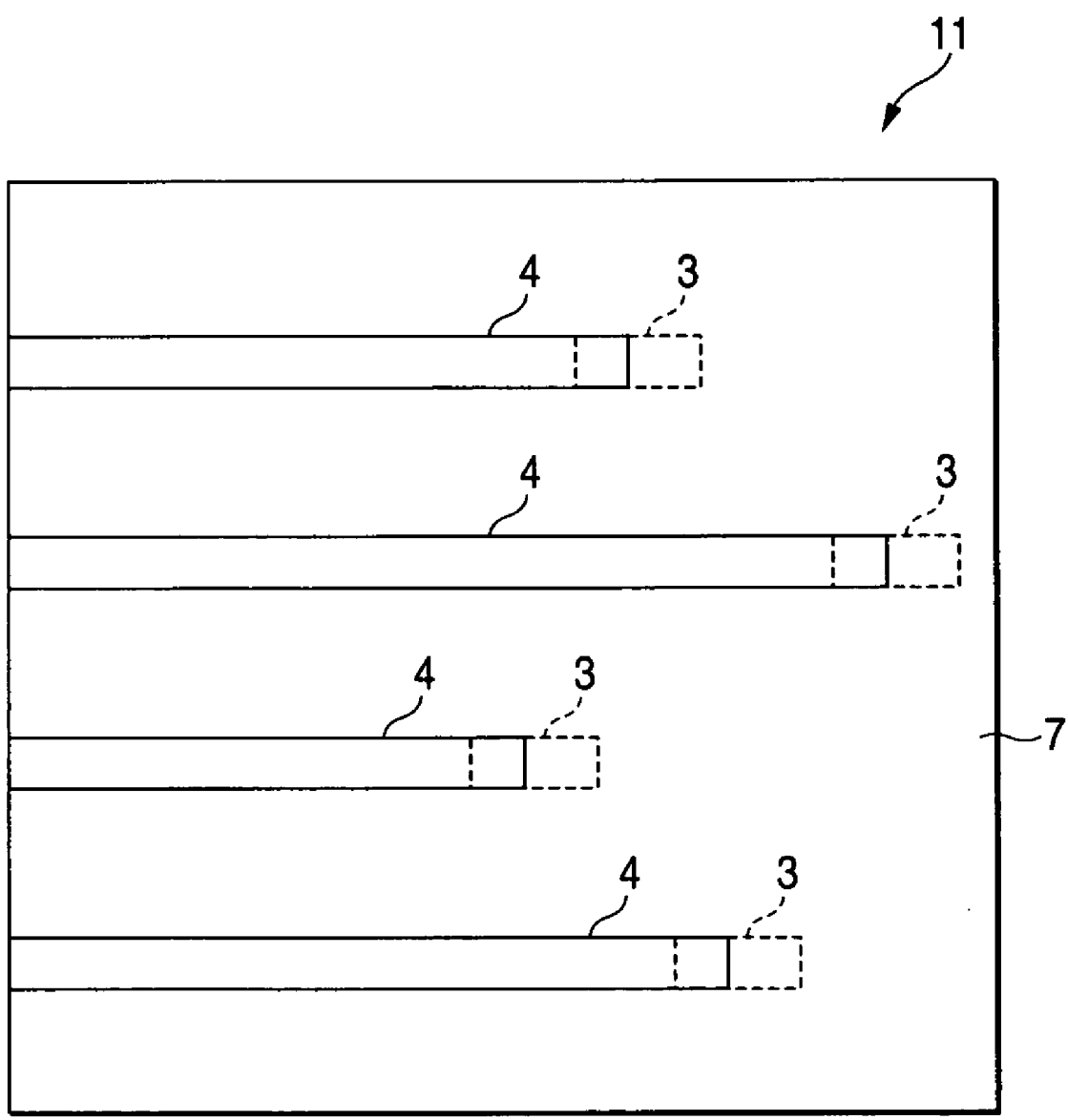
FIG. 2 is a plan view of an optical waveguide produced by the process for optical-waveguide production shown in FIG. 1.

As shown in FIG. 2, the members for optical-path deflection plane formation 3 are disposed at respective positions in accordance with the core layers 4 to be formed in the subsequent step. Namely, the members 3 are disposed at positions where optical paths should be deflected; these positions are the same or different in the lengthwise direction of the core layers 4 and are apart from one another in the width direction perpendicular to the lengthwise direction of the core layers 4, Each member for optical-path deflection plane formation 3 is disposed so that the inclined plane 10 thereof is inclined (e.g., at 45°) from the thickness direction (the thickness direction of the core layers 4, which is the top-to-bottom direction in FIG. 1; the same applies hereinafter).

The disposition of each member for optical-path deflection plane formation 3 can be carried out, for example, by a method in which the surface of the undercladding layer 2 is softened by heating and the member for optical-path deflection plane formation 3 is then press-bonded and fixed to this surface. The heating temperature and the period can be appropriately determined.

Subsequently, in this process, a photosensitive resin layer 5 for forming core layers 4 is formed over the undercladding layer 2 so as to partly cover the members for optical-path deflection plane formation 3, as shown in FIG. 1(c).

The photosensitive resin layer 5 is not particularly limited as long as it gives core layers 4 having a higher refractive index than the undercladding layer 2 and the overcladding layer 7 which will be described later. Examples of usable photosensitive resins include those shown above, i.e., photosensitive polyimide resins, photosensitive polyamide resins, photosensitive silicone resins, photosensitive epoxy resins, photosensitive fluorinated or deuterized resins obtained from these resins, and photosensitive fluorene derivative resins. It is preferred to use a photosensitive polyimide resin or a photosensitive fluorene derivative resin.

The formation of the photosensitive resin layer 5 over the undercladding layer 2 can be carried out by a method in which a varnish (resin solution) for the photosensitive resin layer 5 is prepared and applied onto the undercladding layer 2 by, e.g., casting or spin coating so that at least the inclined plane 10 of each member for optical-path deflection plane formation 3 is partly covered. The varnish applied is then dried.

Thereafter, in this process, the members for optical-path deflection plane formation 3 are removed as shown in FIG. 1(d). The removal of the members for optical-path deflection plane formation 3 can be carried out, for example, by a method in which the undercladding layer 2 and the photosensitive resin layer 5 are heated so as to soften surfaces of these layers (the interface between each layer and each member for optical-path deflection plane formation 3) and each member for optical-path deflection plane formation 3 is pulled out upward in a direction opposite to the end face 8 of the photosensitive resin layer 5 which is in contact with the inclined plane 10.

Subsequently, in this process, a light-reflecting layer 9 is formed on the end face 8 of the photosensitive resin layer 5 which had been in contact with the inclined plane 10 of each member for optical-path deflection plane formation 3, as shown in FIG. 1(e). The light-reflecting layer 9 comprises, for example, a multilayered dielectric film or a metal film, and can be formed, for example, by a vacuum deposition technique such as sputtering. The thickness of the light-reflecting layer 9 is, for example, 50 to 200 nm.

This light-reflecting layer 9 is formed on each end face 8 of the photosensitive resin layer 5 so that it is inclined (e.g., at 45°) from the thickness direction. Each light-reflecting layer 9 is formed so as to have a smooth surface which does not cause light scattering.

A photomask 6 is then disposed in this process In the case where the photosensitive resin layer 5 is patterned, for example, with a negative image, the photomask 6 is disposed so that the parts corresponding to the core layers 4 transmit light and the other parts intercept light, as shown in FIG. 1(f) . Thereafter, the photosensitive resin layer 5 is exposed through this photomask 6. Methods of exposure are not particularly limited, and there can be used a known exposure technique such as, e.g., the hard contact exposure technique in which the photosensitive resin layer 5 is brought into direct contact with the photomask 6, the proximity exposure technique in which the photosensitive resin layer 5 and the photomask 6 are spaced from each other by a slight gap, or the projection exposure technique.

Post-exposure heating is then conducted as needed. Thereafter, in this process, the photosensitive resin layer 5 which has been exposed is developed as shown in FIG. 1(*g*) and then optionally heated. Thus, core layers 4 are formed.

The development of the photosensitive resin layer 5 is not particularly limited. The layer 5 may be developed with a known developing liquid by a known development technique such as, e.g., the spraying method or immersion method. This development removes the unexposed areas in the photosensitive resin layer 5. Thereafter, the photosensitive resin layer 5 is heated at an appropriate temperature according to the kind of the resin. Incidentally, the photosensitive resin layer 5 formed on the side of the members for optical-path deflection plane formation 3 opposite to the photosensitive resin layer 5 having the end faces 8 is removed as unexposed areas by the development, because light is not transmitted thereto due to optical-path deflection by the light-reflecting layer 9 to be formed on each end face 8.

In the case where the photosensitive resin layer 5 is patterned with a positive image, a photomask 6 is disposed so that the parts corresponding to the core layers 4 intercept light and the other parts transmit light, although this is not shown in the figure. Thereafter, the photosensitive resin layer 5 is exposed through this mask 6, subsequently developed, and then heated as needed.

Thus, as shown in FIG. 2, core layers 4 extending parallel with one another along the lengthwise direction and apart from one another in the width direction are formed as light paths which transmit light. The width of each core layer 4 is, e.g., 5 to 100 µm, and the spacing between the core layers 4 is, e.g., 5 to 100 µm. The thickness of each core layer 4 is, e.g., 5 to 100 µm. Furthermore, the core layers 4 are formed so as to differ from one another in the position at which the optical path is deflected (i.e., the position at which the light-reflecting layer is formed).

In this process, an overcladding layer 7 is formed over the undercladding layer 2 so as to cover the core layers 4 as shown in FIG. 1(*h*) to thereby obtain an optical waveguide 11.

For forming the overcladding layer 7, the same resin as that used for the undercladding layer 2 may be used. The undercladding layer 2 and the overcladding layer 7 may be formed from the same resin or from different resins.

The formation of the overcladding layer 7 over the undercladding layer 2 can be carried out, for example, by a method in which a varnish of any of the resins shown above (resin solution) is prepared and this varnish is applied to the undercladding layer 2 by, e.g., casting or spin coating so as to cover the core layers 4 and the reflecting layers 9, dried, and optionally heated. The thickness of the overcladding layer 7 is preferably 5 to 100 µm.

Thereafter, the resultant structure is processed by die-cutting into an appropriate outer shape as needed.

When an optical waveguide 11 is produced in the manner described above, members for optical-path deflection plane formation 3 for respective core layers 4 can be disposed on the undercladding layer 2 at any desired positions in the lengthwise direction of the core layers 4. Because of this, light-reflecting layers 9 for deflecting the optical paths of the core layers 4 can be formed for the respective core layers 4 at any desired positions in the lengthwise direction of the core layers 4. As a result, an optical waveguide 11 can be produced in which the optical paths of the core layers 4 each can be independently deflected at any desired position and which has a high degree of freedom of optical-path deflection.

Furthermore, the process described above is suitable for the case where the members for optical-path deflection plane formation 3 each are large relative to the core layers 4, because the members for optical-path deflection plane formation 3 are removed before a light-reflecting layer 9 is formed on each of the end faces 8 of the photosensitive resin layer 5.

Figure 3:
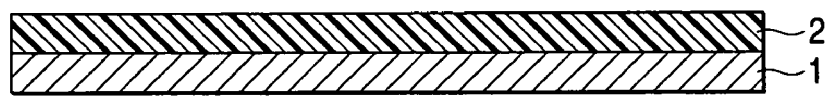
FIGS. 3(a) to (d) are views showing steps of another embodiment of the process of the invention for producing an optical waveguide: (a) illustrates the step of preparing an undercladding layer; (b) illustrates the step of disposing members for optical-path deflection plane formation each having a light-reflecting layer on the undercladding layer; (c) illustrates the step of forming a photosensitive resin layer over the undercladding layer so as to cover the members for optical-path deflection plane formation; and (d) illustrates the step of forming, over the undercladding layer, an overcladding layer so as to cover core layers and the members for optical-path deflection plane formation.
Figure 3:
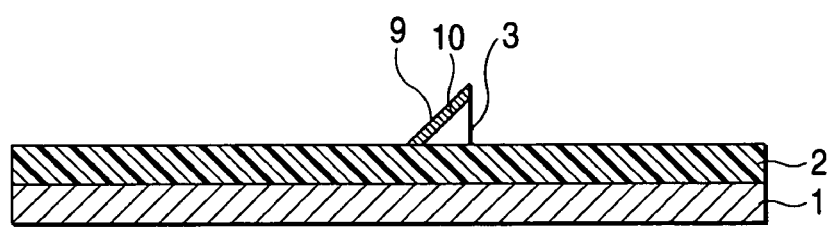
Figure 3:
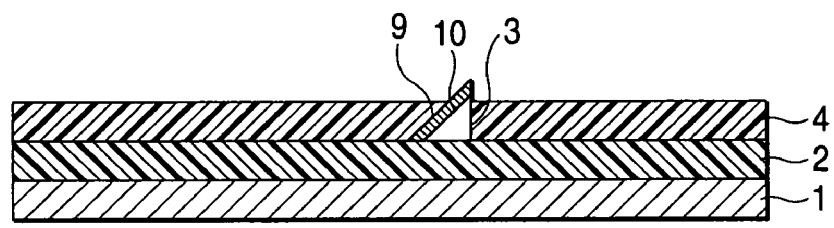
Figure 3:
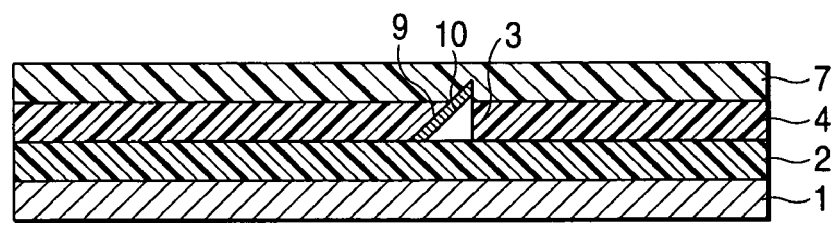

In the case where the members for optical-path deflection plane formation 3 to be used are not so large relative to the core layers 4 to be formed (e.g., in the case where the members 3 can be covered with an overcladding layer 7), the following method may be used. A light-reflecting layer 9 is formed beforehand on the inclined plane 10 of each member for optical-path deflection plane formation 3. After these members for optical-path deflection plane formation 3 are disposed on an undercladding layer 2, they are embedded, without being removed, in core layers 4 and an overcladding layer 7. FIG. 3 are views illustrating steps of another embodiment of the process of the invention for producing an optical waveguide, showing a process for producing an optical waveguide 11 by such a method. In FIG. 3, members which are the same as those shown above are designated by the same numerals. Explanations therefor are omitted here.

In this process shown in FIG. 3, an undercladding layer 2 is prepared first by forming it on a substrate 1 by the same method as described above, as shown in FIG. 3(*a*).

Subsequently, as shown in FIG. 3(*b*), the members for optical-path deflection plane formation 3 are disposed on the undercladding layer 2 by the same method as described above.

The members for optical-path deflection plane formation 3 to be used each are, for example, a triangular prism obtained from a square prism having a side length of from 30 µm to 1 cm made of synthetic quartz or borosilicate glass (BK-7) by cutting it along the plane extending through corresponding diagonal lines in the opposed square faces. These members for optical-path deflection plane formation 3 each have a light-reflecting layer 9 formed beforehand on the inclined plane 10.

The light-reflecting layer 9 may comprise, e.g., a multi-layered dielectric film or metal film formed on the inclined plane 10, which is the plane formed by cutting, of the triangular cut prism by a vacuum deposition technique such as sputtering like the light-reflecting layer 9 described above. The thickness of the light-reflecting layer 9 is, for example, 50 to 200 nm.

Subsequently, in this process, core layers 4 are formed on the undercladding layer 2 so as to cover the members for optical-path deflection plane formation 3 by the same method as described above, as shown in FIG. 3(*c*). The thickness of each core layer 4 is, for example, 30 to 100 µm.

In this process, the members for optical-path deflection plane formation 3 are not removed and an overcladding layer 7 covering core layers 4 and the members for optical-path deflection plane formation 3 are formed over the undercladding layer 2 by the same methods as described above while keeping the members 3 as being disposed, as shown in FIG. 3(*d*). Thus, an optical waveguide 11 is obtained. The thickness of the overcladding layer 7 is preferably 20 to 200 µm.

By this process also, members for optical-path deflection plane formation 3 for respective core layers 4 can be disposed on the undercladding layer 2 at any desired positions in the lengthwise direction of the core layers 4.

Because of this, light-reflecting layers 9 for deflecting the optical paths of the core layers 4 can be formed for the respective core layers 4 at any desired positions in the lengthwise direction of the core layers 4. As a result, an optical waveguide 11 can be produced in which the optical paths of the core layers 4 each can be independently deflected at any desired position and which has a high degree of freedom of optical-path deflection.

In the explanations given above, the members for optical-path deflection plane formation 3 each were a triangular prism obtained by cutting a square prism along the plane extending through corresponding diagonal lines in the opposed square faces. However, the shape of the members for optical-path deflection plane formation 3 is not particularly limited, and the members 3 may have an appropriate shape according to the angle at which the optical path in each core layer 4 is to be deflected.

EXAMPLES

The invention will be illustrated in greater detail with reference to the following Examples, but the invention should not be construed as being limited thereto.

Preparation of Varnishes

According to the formulations shown in Table 1, the ingredients were mixed/dissolved using cyclohexanone as a solvent to prepare fluorene derivative varnish A and fluorene derivative varnish B. The refractive indexes, as measured at a wavelength of 633 nm, of cured resins respectively obtained by curing the varnishes are also shown in Table 1.

TABLE 1

|  |  | (parts by weight) Varnish | |
|---|---|---|---|
|  |  | A | B |
| Fluorene derivative 1 | *1 | 83 | 67 |
| Fluorene derivative 2 | *2 | — | 33 |
| Diluent | *3 | 17 | — |
| Photo-acid generator | *4 | 1 | 1 |
| Refractive index of cured resin (measuring wavelength, 633 nm) |  | 1.585 | 1.615 |

*1: Bisphenoxyethanolfluorene diglycidyl ether
*2: Bisphenolfluorene diglycidyl ether
*3: 3,4-Epoxycyclohexenylmethyl 3',4'-epoxycyclohexenecarboxylate (Celoxide 2021P, manufactured by Daicel Chemical Industries, Ltd.)
*4: 50% propylene carbonate solution of 4,4-bis[(di(β-hydroxyethoxy)phenylsulfinio)phenyl sulfide bishexafluoroantimonate Example 1

Fluorene derivative varnish A was applied by spin coating on a 1 mm-thick substrate which was made of a glass-epoxy resin and had a 10 cm×10 cm flat plate shape. The varnish applied was dried at 100° C. for 15 minutes to form a photosensitive resin layer. The whole photosensitive resin layer was irradiated with ultraviolet in an exposure dose of 2,000 mJ/cm$^2$. Thereafter, the resin layer was heated at 100° C. for 20 minutes to thereby form an undercladding layer having a thickness of 20 μm (see FIG. 1(a)).

Subsequently, triangular prisms were formed from cubes having a side length of 1 cm made of synthetic quartz by cutting each cube along the plane extending through corresponding diagonal lines in opposed square faces. Ten such prisms as members for optical-path deflection plane formation were disposed on the undercladding layer in appropriate positions. Thereafter, the undercladding layer was heated at 100° C. for 30 seconds and then cooled to room temperature to fix the members for optical-path deflection plane formation (see FIG. 1(b)).

Fluorene derivative varnish B was then applied by spin coating on the undercladding layer so as to partly cover the members for optical-path deflection plane formation. The varnish applied was dried at 100° C. for 30 minutes to form a photosensitive resin layer (see FIG. 1(c)).

Thereafter, the undercladding layer and the photosensitive resin layer were heated at 100° C. for 10 seconds and the members for optical-path deflection plane formation were pulled out of the photosensitive resin layer (see FIG. 1(d)). A light-reflecting layer having a thickness of 100 nm comprising a multilayered dielectric film was then formed by sputtering on each of those end faces of the photosensitive resin layer which had been in contact with the inclined planes of the members for optical-path deflection plane formation (see FIG. 1(e)). This light-reflecting layer on each end face of the photosensitive resin layer was formed so as to be inclined at 45° from the thickness direction.

A photomask in which a pattern of linear optical paths having a width of 50 μm had been drawn was used to irradiate the photosensitive resin by the contact exposure method in an exposure dose of 2,000 mJ/cm$^2$ (see FIG. 1(f)). Furthermore, post-exposure heating was conducted at 100° C. for 60 minutes. Thereafter, the photosensitive resin was developed with an acetonitrile-based developing liquid by the immersion method and then heated at 100° C. for 10 minutes to remove the acetonitrile infiltrated in the photosensitive resin and thereby form core layers having a thickness of 50 μm (see FIG. 1(g)). Thus, ten core layers were formed which extended parallel with one another along the lengthwise direction and were apart from one another in the width direction. These core layers were formed so as to differ from one another in the position where the optical path was deflected (i.e., the position at which the light-reflecting layer had been formed).

Thereafter, fluorene derivative varnish A was applied on the undercladding layer by spin coating so as to cover the core layers and the light-reflecting layers. The varnish applied was dried at 100° C. for 20 minutes to form a photosensitive resin layer. The whole photosensitive resin layer was irradiated with ultraviolet in an exposure dose of 3,000 mJ/cm$^2$. Thereafter, the resin layer was heated at 100° C. for 30 minutes to thereby form an overcladding layer having a thickness of 80 μm (see FIG. 1(h)).

Finally, a die cutter (Model 522, manufactured by Disco Corp.) was used to cut the resultant structure to form end faces of the core layers in the lengthwise-direction side thereof opposite to the light-reflecting layers. Thus, entrance end faces for light incidence were formed.

Light having a wavelength of 850 nm was caused to enter the ten core layers through the entrance end faces, and the reflection loss caused by each light-reflecting layer was determined. As a result, the reflection loss for each light-reflecting layer was found to be 1.0 dB.

Example 2

Fluorene derivative varnish A was applied by spin coating on a 1 mm-thick substrate which was made of a glass-epoxy resin and had a 10 cm×10 cm flat plate shape. The varnish applied was dried at 100° C. for 15 minutes to form a photosensitive resin layer. The whole photosensitive resin layer was irradiated with ultraviolet in an exposure dose of 2,000 mJ/cm$^2$. Thereafter, the resin layer was heated at 100°

C. for 20 minutes to thereby form an undercladding layer having a thickness of 20 μm (see FIG. 3 (a)).

Subsequently, triangular prisms were formed from cubes having a side length of 80 μm made of synthetic quartz by cutting each cube along the plane extending through corresponding diagonal lines in opposed square faces. A light-reflecting layer having a thickness of 100 nm comprising a multilayered dielectric film was formed by sputtering on the inclined plane of each prism as a member for optical-path deflection plane formation.

Ten such members for optical-path deflection plane formation were disposed on the undercladding layer in appropriate positions. Thereafter, the undercladding layer was heated at 100° C. for 30 seconds and then cooled to room temperature to fix the members for optical-path deflection plane formation (see FIG. 3(b)).

Fluorene derivative varnish B was then applied by spin coating on the undercladding layer so as to cover the members for optical-path deflection plane formation. The varnish applied was dried at 100° C. for 30 minutes to form a photosensitive resin layer. Thereafter, a photomask in which a pattern of linear optical paths having a width of 50 μm had been drawn was used to irradiate the photosensitive resin by the contact exposure method in an exposure dose of 2,000 mJ/cm$^2$.

Furthermore, post-exposure heating was conducted at 100° C. for 60 minutes. Thereafter, the photosensitive resin was developed with an acetonitrile-based developing liquid by the immersion method and then heated at 100° C. for 10 minutes to remove the acetonitrile infiltrated in the photosensitive resin and thereby form core layers having a thickness of 50 μm (see FIG. 3(c)). Thus, ten core layers were formed which extended parallel with one another along the lengthwise direction and were apart from one another in the width direction. These core layers were formed so as to differ from one another in the position where the optical path was deflected (i.e., the position at which the light-reflecting layer had been formed).

Thereafter, fluorene derivative varnish A was applied on the undercladding layer by spin coating so as to cover the core layers and the light-reflecting layers. The varnish applied was dried at 100° C. for 20 minutes to form a photosensitive resin layer. The whole photosensitive resin layer was irradiated with ultraviolet in an exposure dose of 3,000 mJ/cm$^2$. Thereafter, the resin layer was heated at 100° C. for 30 minutes to thereby form an overcladding layer having a thickness of 80 μm (see FIG. 3(d)).

Finally, a die cutter (Model 522, manufactured by Disco Corp.) was used to cut the resultant structure to form end faces of the core layers in the lengthwise-direction side thereof opposite to the light-reflecting layers. Thus, entrance end faces for light incidence were formed.

Light having a wavelength of 850 nm was caused to enter the ten core layers through the entrance end faces, and the reflection loss caused by each light-reflecting layer was determined. As a result, the reflection loss for each light-reflecting layer was found to be 1.0 dB.

While the present invention has been described in detail and with reference to specific embodiments thereof, it will be apparent to one skilled in the art that various changes and modifications can be made therein without departing from the spirit and scope thereof.

This application is based on Japanese Patent Application No. 2005-066003 filed Mar. 9, 2005, the contents thereof being herein incorporated by reference.

What is claimed is:

1. A process for producing an optical waveguide which comprises;
    disposing on an undercladding layer at least one member for forming an optical-path deflection plane;
    forming a photosensitive resin layer over the undercladding layer so as to at least partly cover the member for forming an optical-path deflection plane;
    removing the member for forming an optical-path deflection plane after the formation of the photosensitive resin layer;
    subjecting the photosensitive resin layer to exposure and then development to thereby form at least one core layer; and
    forming an overcladding layer over the undercladding layer so as to cover the at least one core layer.

2. The process for producing an optical waveguide of claim 1, which further comprises forming a light-reflecting layer, after the removal of the member for forming an optical-path deflection plane, on an end face of the photosensitive resin layer that had been in contact with the member for forming an optical-path deflection plane.

3. The process for producing an optical waveguide of claim 1, wherein the member for forming an optical-path deflection plane has a light-reflecting layer formed on a surface thereof that is to be in contact with the photosensitive resin layer.

* * * * *